(12) United States Patent
Nakano et al.

(10) Patent No.: US 7,190,395 B2
(45) Date of Patent: Mar. 13, 2007

(54) APPARATUS, METHOD, PROGRAM AND RECORDING MEDIUM FOR IMAGE RESTORATION

(75) Inventors: Yuusuke Nakano, Akashi (JP); Mutsuhiro Yamanaka, Suita (JP); Kazuchika Sato, Kobe (JP)

(73) Assignee: Minolta Co., Ltd., Osaka (JP)

( * ) Notice: Subject to any disclaimer, the term of this patent is extended or adjusted under 35 U.S.C. 154(b) by 920 days.

(21) Appl. No.: 10/114,164

(22) Filed: Apr. 2, 2002

(65) Prior Publication Data
US 2003/0184663 A1    Oct. 2, 2003

(51) Int. Cl.
G03B 13/00    (2006.01)
H04N 5/232    (2006.01)
H04N 5/217    (2006.01)
H04N 5/225    (2006.01)

(52) U.S. Cl. .............. 348/241; 348/349; 348/353; 382/254; 382/260

(58) Field of Classification Search ........... 348/347, 348/349–351, 353, 362–365; 382/254, 260–266, 382/270–272
See application file for complete search history.

(56) References Cited

U.S. PATENT DOCUMENTS

| | | | | |
|---|---|---|---|---|
| 5,012,270 A | * | 4/1991 | Sekine et al. | 396/54 |
| 5,107,293 A | * | 4/1992 | Sekine et al. | 396/55 |
| 5,353,058 A | * | 10/1994 | Takei | 348/363 |
| 5,861,917 A | * | 1/1999 | Tariki et al. | 348/230.1 |
| 6,154,574 A | * | 11/2000 | Paik et al. | 382/255 |
| 6,285,799 B1 | * | 9/2001 | Dance et al. | 382/261 |
| 6,507,366 B1 | * | 1/2003 | Lee | 348/352 |
| 2001/0008418 A1 | * | 7/2001 | Yamanaka et al. | 348/222 |
| 2003/0169353 A1 | * | 9/2003 | Keshet et al. | 348/272 |

FOREIGN PATENT DOCUMENTS

JP    2000-020691 A    1/2000

* cited by examiner

*Primary Examiner*—Ngoc-Yen Vu
*Assistant Examiner*—Carramah J. Quiett
(74) *Attorney, Agent, or Firm*—Sidley Austin LLP

(57) ABSTRACT

An image of which restoration degree is determined based on the difference between each pixel and a neighboring pixel of the pixel in a light receiving element array 101 is divided into a plurality of areas based on the determined restoration degree, and the areas of the image are each restored in accordance with the determined restoration degree. By doing this, not only ringing and noise enhancement can effectively be suppressed but also the border between the areas which is conspicuous when the image is divided into two kinds of areas becomes less conspicuous, so that a natural restored image can be obtained.

12 Claims, 13 Drawing Sheets

| 0 | 0 | 0 |
|---|---|---|
| 0 | 1 | 0 |
| 0 | 0 | 0 |

| 0 | 1/6 | 0 |
|---|---|---|
| 1/6 | 1/3 | 1/6 |
| 0 | 1/6 | 0 |

| 1/8 | 1/8 | 0 |
|---|---|---|
| 1/8 | 1/4 | 1/8 |
| 0 | 1/8 | 1/8 |

| 0 | 0 | 0 |
|---|---|---|
| 0 | 1/4 | 1/4 |
| 0 | 1/4 | 1/4 |

APPARATUS, METHOD, PROGRAM AND RECORDING MEDIUM FOR IMAGE RESTORATION

This application is based on application No. 2001-100478 filed in Japan, the content of which is hereby incorporated by reference.

BACKGROUND OF THE INVENTION

1. Field of the Invention

The present invention relates to an image restoration apparatus, an image restoration method, a program and a recording medium for restoring the degradation of an image obtained as image data by a digital camera or the like.

2. Description of the Related Art

Conventionally, various techniques have been proposed to restore the degradation of an image obtained as image data by use of a light receiving element array such as CCD. Image degradation is that the actually obtained image is degraded compared to the ideal image to be obtained from the object to be taken. For example, an image obtained by use of a digital camera is degraded by aberrations depending on, e.g. the aperture value, the focal length and the position of focus point, and is further degraded by an optical low pass filter for preventing spurious resolution. The image is also degraded by a camera-shake caused at the time of phototaking.

On such a degraded image, restoration to approximate the obtained image to the ideal image by modeling image degradation has conventionally been performed. For example, image restoration has been performed by, regarding image degradation as being caused while an optical flux to be incident on each light receiving element is spreading according to the Gaussian distribution, causing a restoration function to act on the entire image or causing a filter that enhances an edge of the image to act on the entire image.

However, image degradation is not always caused on the entire image. For example, when an object of a geometric pattern or with a monochromatic background is photographed or when an original for character recognition is scanned, an area not affected by degradation is present in the image.

When image restoration is performed on the entire image, there are cases where an area not requiring restoration is also adversely affected. For example, when restoration is performed on an area where noise and an edge are present, ringing and noise enhancement are caused, so that the area not requiring restoration is also adversely affected.

To solve this problem, a technique has already been proposed to perform image restoration while influence of ringing and the like is avoided by performing image processing only on a specific area.

However, according to this technique, since the area is divided into two kinds of areas, namely, an area to be restored and an area not to be restored, discontinuity on the border between the two kinds of areas is conspicuous, so that the restored image is unnatural.

SUMMARY OF THE INVENTION

The present invention is made to solve the above-mentioned problem, and an object thereof is to provide an image restoration apparatus and an image restoration method with which ringing and noise enhancement are suppressed and a natural restored image can be obtained, and provide a program and a recording medium for causing a computer to perform such restoration.

To attain the above-mentioned object, one aspect of the present invention provides an image restoration apparatus comprising: a restoration degree determination part determining a restoration degree for each of portions of an image; and a restoring part restoring each of the portions of the image in accordance with the determined restoration degree by use of at least one point spread function representative of a degradation characteristic of the image.

According to this image restoration apparatus, the restoration degree is determined for each of portions of the image, and each of the portions of the image is restored in accordance with the determined restoration degree. Consequently, not only ringing and noise enhancement which are caused when restoration is performed on areas not requiring restoration are effectively suppressed but also the border between the divisional areas is less conspicuous than when the image is divided into two kinds of areas, namely, an area on which restoration is performed and an area on which no restoration is performed. As a result, a restored image being natural as a while can be obtained.

Moreover, to attain the above-mentioned object, another aspect of the present invention provides an image restoration method comprising: determining a restoration degree for each of portions of an image; and restoring each of the portions of the image in accordance with the determined restoration degree by use of at least one point spread function representative of a degradation characteristic of the image.

According to this image restoration method, not only ringing and noise enhancement are effectively suppressed but also discontinuity on the border between the divisional areas is reduced unlike when the image is divided into two kinds of areas, so that a natural restored image can be obtained.

Moreover, to attain the above-mentioned object, further aspect of the present invention provides a program for causing a computer to carry out the following performance, and a recording medium on which this program is recorded: determining a restoration degree for each of portions of an image; and restoring each of the portions of the image in accordance with the determined restoration degree by use of at least one point spread function representative of a degradation characteristic of the image.

According to this program and this recording medium, the computer can be caused to perform the processing to determine the restoration degree for each of portions of the image and restore each of the portions of the image in accordance with the determined restoration degree by use of at least one point spread function representative of the degradation characteristic of the image.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
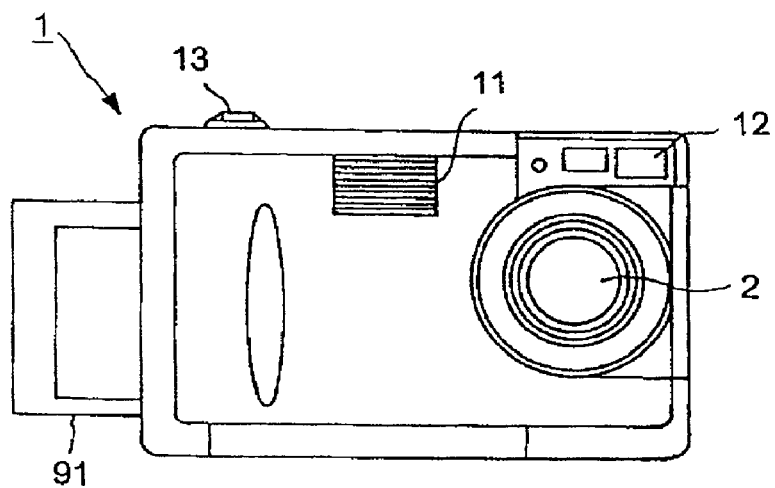
FIG. 1 showing a first embodiment of the present invention is a front view of a digital camera.
Figure 2:
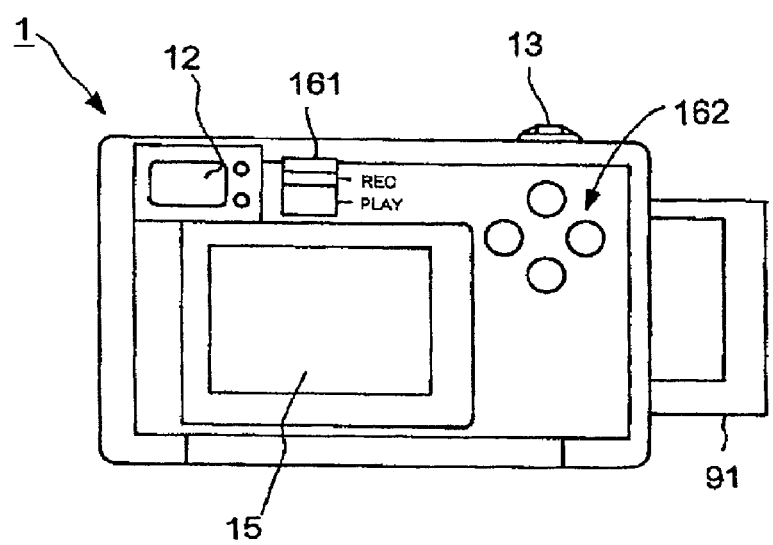
FIG. 2 is a rear view of the digital camera.

FIGS. 1 to 4 show a first embodiment of the present invention. These figures show the appearance of a digital camera 1 as an image restoration apparatus. FIGS. 1 and 2 show a condition where a memory card 91 is under insertion or removal. The memory card 91 is not shown in FIG. 3.

The external structure of the digital camera 1 is similar to that of normal digital cameras. As shown in FIG. 1, on the front surface, a lens unit 2 directing light from the object to the CCD and an electronic flash 11 emitting flash light toward the object are disposed. Above the lens unit 2, a viewfinder 12 for viewing the area to be photographed of the object is disposed.

Figure 3:
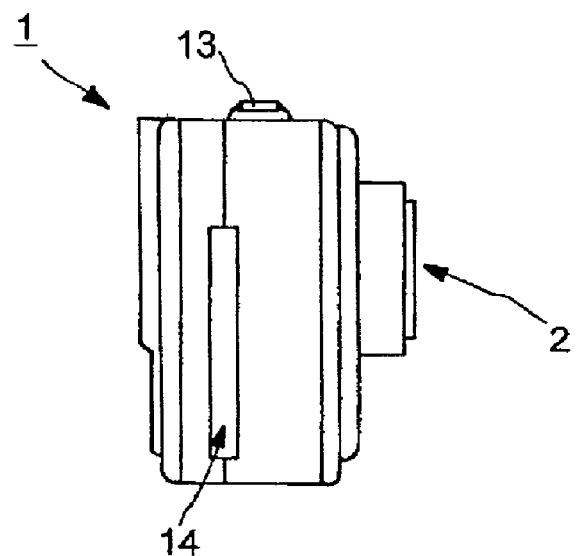
FIG. 3 is a side view of the digital camera.

On the top surface, a shutter start button 13 (hereinafter, referred to as start button) for starting photo-taking is disposed. On the left side surface, as shown in FIG. 3, a card slot 14 for inserting the memory card 91 is provided.

On the rear surface of the digital camera 1, as shown in FIG. 2, the following are disposed: a liquid crystal display (LCD) 15 on which an image obtained by photo-taking and an operation menu are displayed; a changeover switch 161 for switching between a photo-taking mode and a reproduction mode; and four-way keys 162 accepting the user's selection input.

Figure 4:
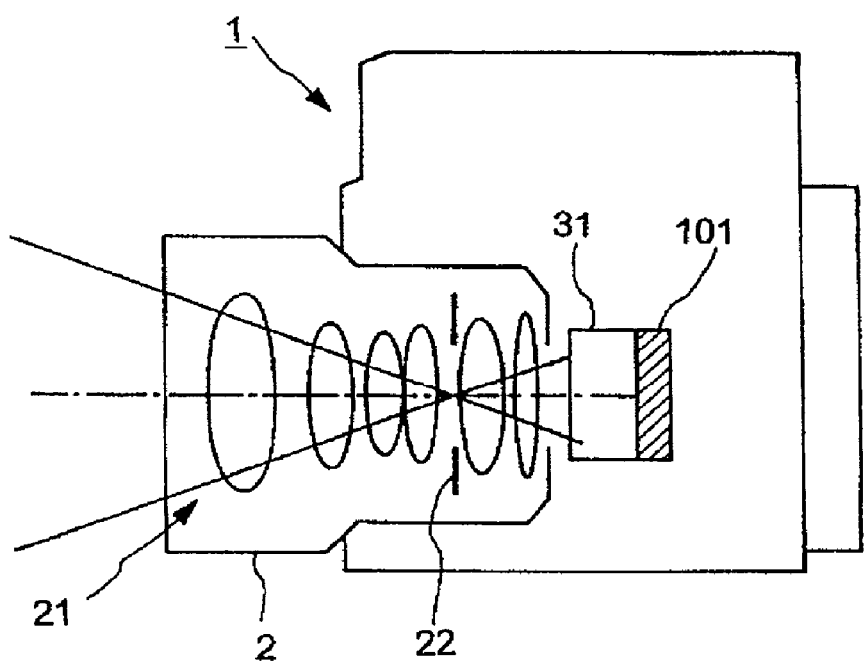
FIG. 4 is a longitudinal cross-sectional view of a lens unit and the vicinity thereof in the digital camera.

In FIG. 4, the lens unit 2 has a lens system 21 comprising a plurality of lens elements, and an aperture stop 22. In the rear of the lens unit 2, an optical low pass filter 31 and a color CCD 101 of one charged coupled device system (hereinafter, referred to as CCD) comprising a two-dimensional light receiving element array are disposed in this order. That is, the lens system 21, the aperture stop 22 and the optical low pass filter 31 constitute an optical system that directs the light from the object to the CCD 101 in the digital camera 1.

Figure 5:
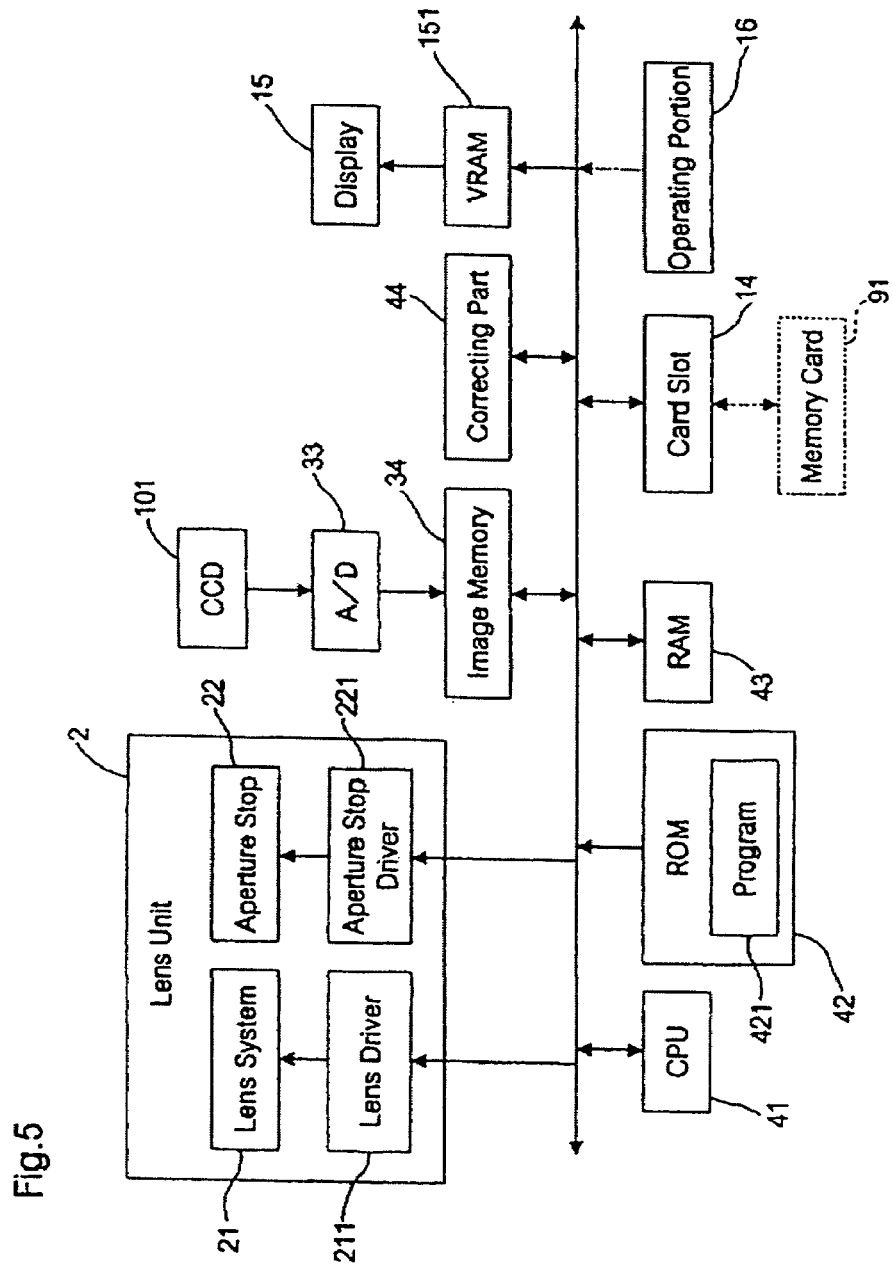
FIG. 5 is a block diagram showing the internal structure of the digital camera.

FIG. 5 is a block diagram showing the principal internal structure of the digital camera 1. In FIG. 5, the start button 13, the changeover switch 161 and the four-way keys 162 are collectively shown as an operation portion 16.

In FIG. 5, a CPU 41, a ROM 42 and a RAM 43 control the overall operation of the digital camera 1, and are each connected to a bus. By the CPU 41 performing calculation and control according to an operating program 421 stored in the ROM 42 with the RAM 43 as the work area, the operation of each part of the digital camera 1 and image processing are performed.

The lens unit 2 has not only the lens system 21 and the aperture stop 22 but also a lens driver 211 and an aperture stop driver 221 for driving them. The lens system 21 and the aperture stop 22 are controlled as appropriate by the CPU 41 in accordance with the output of a distance measuring sensor and the brightness of the object.

The CCD 101 is connected to an analog to digital converter 33 (hereinafter, referred to as A/D converter), and outputs the image of the object formed through the lens system 21, the aperture stop 22 and the optical low pass filter 31 to the A/D converter 33 as an image signal. The image signal is converted to a data signal (hereinafter, referred to as image data) by the A/D converter 33, and is then stored into an image memory 34. That is, the image of the object is obtained as image data by the optical system, the CCD 101 and the A/D converter 33.

A corrector 44 performs various image processings such as white balance correction, gamma correction, noise removal, color correction and color enhancement on the image data in the image memory 34. The corrected image data is transferred to a VRAM (video RAM) 151, whereby the image is displayed on the display 15. When necessary, the image data is recorded onto the memory card 91 through the card slot 14 by the user's operation.

In the digital camera 1, a processing to restore the degradation by an influence of the optical system is performed on the obtained image data. This restoration is realized by the CPU 41 performing calculation according to the operating program 421 stored in the ROM 42. While in the digital camera 1, image processing (correction and restoration) is substantially performed by processing image data, in the description that follows, the image data to be processed will be referred to simply as "image" when necessary.

Next, image degradation in the digital camera 1 will be described.

Image degradation is a phenomenon that the image obtained through the CCD 101, the A/D converter 33 and the like of the digital camera 1 is not an ideal image. The image degradation is caused because a light ray emanating from one point on the object does not converge to one point on the CCD 101 but is distributed so as to spread. In other words, in a case where an ideal image is obtained, image degradation is caused because an optical flux to be incident on one light receiving element (that is, pixel) of the CCD 101 spreads to be incident on surrounding light receiving elements.

In the digital camera 1 of the present embodiment, image deterioration by the optical system including the lens system 21, the aperture stop 22 and the optical low pass filter 31 is restored.

Figures 6, 7, 8:
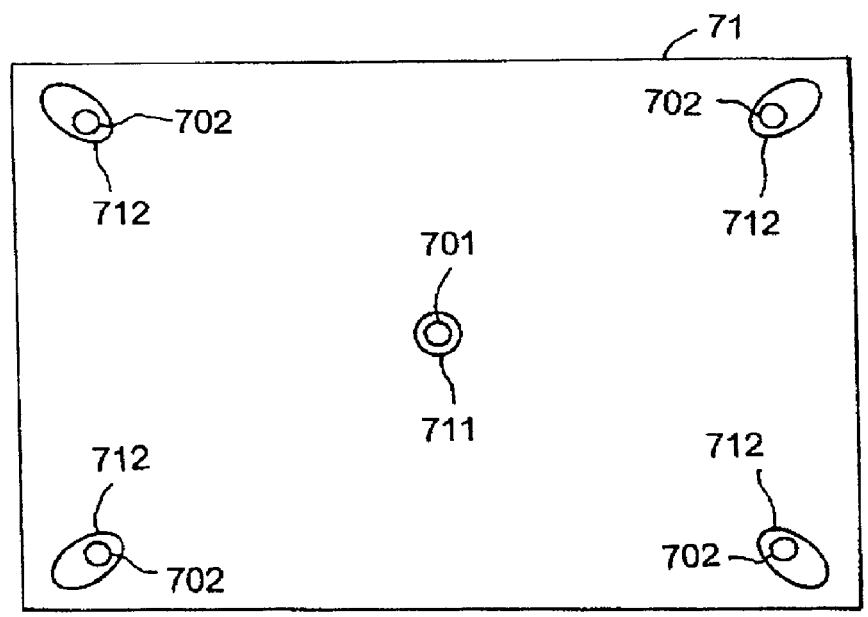
FIG. 6 is a view of assistance in explaining image deterioration by the lens unit.
FIG. 7 is a view of assistance in explaining the image deterioration by the lens unit.
FIG. 8 is a view of assistance in explaining the image deterioration by the lens unit.

Reference number 71 of FIG. 6 represents the entire image. When it is assumed that in the case of an ideal image (that is, an image not degraded by the image of the optical system; this image will hereinafter be referred to as ideal image), the area designated by 701 is reproduced so as to be bright, in the case of the actually obtained image (referred to as obtained image), an area 711 larger than the area 701 is reproduced so as to be bright according to the focal length of the lens system 21 (corresponding to the moving out amount of a variator lens in a zoom lens system), the position of focus point and the aperture value of the aperture stop 22. That is, the optical flux to be ideally incident on an area on the CCD 101 corresponding to the area 701 spreads to be actually incident on an area corresponding to the area 711.

When it is assumed that in the peripheral part of the image 71, in the case of an ideal image, the areas designated by 702 are reproduced so as to be bright, in the case of the obtained image, the substantially elliptical areas designated by 712 are reproduced so as to be bright.

Figures 9, 10, 11:
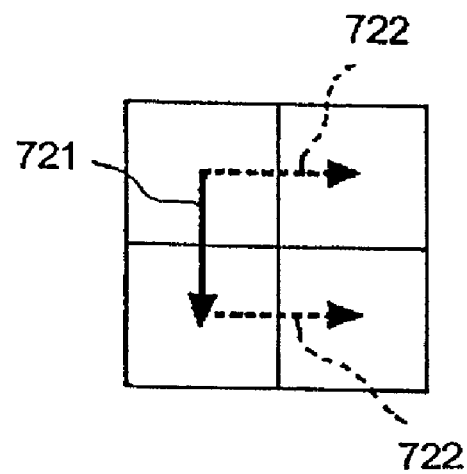
FIG. 9 is a view of assistance in explaining the image deterioration by the lens unit.
FIG. 10 is a view of assistance in explaining image degradation by an optical low pass filter.
FIG. 11 is a view of assistance in explaining the image degradation by the optical low pass filter.

FIGS. 7 to 9 are schematic views of assistance in explaining the image degradation by an optical influence of the lens unit 2 at the level of the light receiving elements of the CCD 101.

FIG. 7 shows a condition where an optical flux with an intensity of 1 is incident only on the light receiving element at the center of a 3×3 light receiving element array when no degradation is caused by the lens unit 2 (that is, a condition where an ideal image is obtained). On the contrary, FIGS. 8 and 9 show conditions where the condition shown in FIG. 7 is changed by an influence of the lens unit 2.

FIG. 8 showing an example of the condition in the vicinity of the center of the CCD 101 shows a condition where light with an intensity of ⅓ is incident on the central light receiving element and light with an intensity of ⅙ is incident on the upper, lower, right and left adjoining light receiving elements. That is, FIG. 8 shows a condition where the optical flux to be incident on the central light receiving element spreads to be incident on the surrounding light receiving elements by an influence of the lens unit 2. FIG. 9 showing an example of the condition in the peripheral part of the CCD 101 shows a condition where while light with an intensity of ¼ is incident on the central light receiving element, light is incident while spreading from the upper left to the lower right.

This image degradation characteristic is called a point spread function (or a point spread filter) because it can be expressed as a function to convert the values of the pixels of an ideal image to the pixel value distribution shown in FIGS. 8 and 9 (that is, a two-dimensional filter based on a point image distribution).

The point spread function representative of the characteristic of the degradation by an influence of the lens unit 2 can be obtained in advance for each light receiving element position (that is, for each pixel position) based on the focal length of the lens system 21, the position of focus point and the aperture value of the aperture stop 22. Therefore, in the digital camera 1, as described later, the information on the lens arrangement and the aperture value are obtained from the lens unit 2, the point spread function corresponding to the pixel position is obtained, and restoration of the obtained image is realized based on the point spread function.

The point spread function associated with the lens unit 2 is generally a nonlinear function with the following as parameters: the focal length; the position of focus point; the aperture value; and the two-dimensional coordinates on the CCD 101 (that is, of the pixels in the image). While in FIGS. 7 to 9, no mention is made of the color of the image for convenience, in the case of a color image, a point spread function corresponding to each of R, G and B or a point spread function being a combination of the point spread functions of the colors is obtained. However, for simplification of the processing, the point spread functions corresponding to R, G and B may be the same ignoring chromatic aberration.

FIG. 10 is a schematic view of assistance in explaining the degradation by an influence of the optical low pass filter 31 at the level of the light receiving elements of the CCD 101. The optical low pass filter 31 prevents spurious resolution by limiting the band by use of a birefringent optical material. In the case of a color CCD of one charged coupled device system, the optical low pass filter 31 separates the light to be incident on the upper left light receiving element as shown in FIG. 10 into upper and lower parts as shown by the arrow 721, and then, separates the light into right and left parts as shown by the arrows 722.

In many cases, a green (G) filter is formed on two light receiving elements, on a diagonal line, of the four adjoining light receiving elements, and red (R) and blue (B) filters are formed on the remaining two light receiving elements in a color CCD of one charged coupled device system. The RGB values of the pixels are obtained by interpolation with reference to the information obtained from the surrounding pixels.

However, since the number of pixels of G is twice the numbers of pixels of R and B in the color CCD of one charged coupled device system, when the data obtained from the CCD is used as it is, an image in which the resolution of G is higher than the resolutions of R and B is obtained, so that the high-frequency components of the object image that cannot be captured by the light receiving elements on which R and B filters are formed appear as spurious resolution.

Therefore, the optical low pass filter 31 having a characteristic as shown in FIG. 10 is disposed on the front surface of the CCD 101. However, by an influence of the optical low pass filter 31, the high-frequency components of the image obtained from the light receiving elements of G are degraded.

FIG. 11 is a view illustrating the distribution of the optical flux to be incident on the central light receiving element by the optical low pass filter 31 having the characteristic shown in FIG. 10, that is, a view schematically showing the characteristic of the point spread function corresponding to the optical low pass filter 31.

As shown in FIG. 11, the optical low pass filter 31 divides the optical flux to be incident on the central light receiving element so as to be incident on 2×2 light receiving elements. Therefore, in the digital camera 1, as described later, a point spread function corresponding to the optical low pass filter 31 is prepared, and restoration of the obtained image is realized based on the point spread function.

In the restoration using the point spread function associated with the optical low pass filter 31, the brightness component is obtained from the after-interpolation RGB values, and restoration is performed on the brightness component. Moreover, as another restoration method, it may be performed to perform restoration on the G components after the G components are interpolated and interpolate the R and B components by use of the restored G components.

While the point spread function is obtained for each pixel in the description given above, as the point spread function, a combination of the point spread functions of a plurality of pixels or a combination of the point spread functions of all the pixels, that is, a transformed string corresponding to deterioration of a plurality of pixels may be obtained.

Next, image restoration will be described. Regarding the image as a vector in which pixel values are vertically arranged in raster order and regarding the point spread function as a matrix, image restoration is frequently resolved into a problem of solving simultaneous linear equations. That is, when the restored image is X, the point spread matrix is H and the obtained image is Y, the relationship of the following expression 1 is satisfied:

$$HX=Y \quad (1)$$

Generally, the obtained image Y includes noise, and the point spread matrix H normally includes an observational error or a discretization error. Therefore, a solution that minimizes the evaluation function E of the following expression 2 is obtained:

$$E=\|HX-Y\|^2 \Rightarrow \min \quad (2)$$

To solve this minimization problem, using the fact that the point spread matrix H is a large and sparse matrix, the iteration method is frequently used.

However, when the iteration is repeated with the entire image, that is, all the components of the image X to be restored being unknowns, noise such as ringing tends to be caused in the vicinity of the edge of the restored image. When the restoration is performed on areas where noise and an edge are present, ringing and noise enhancement are caused, so that areas not requiring restoration are also adversely affected.

Therefore, an example of a solution to this problem will be described with reference to FIGS. 12 and 13.

Figure 12:
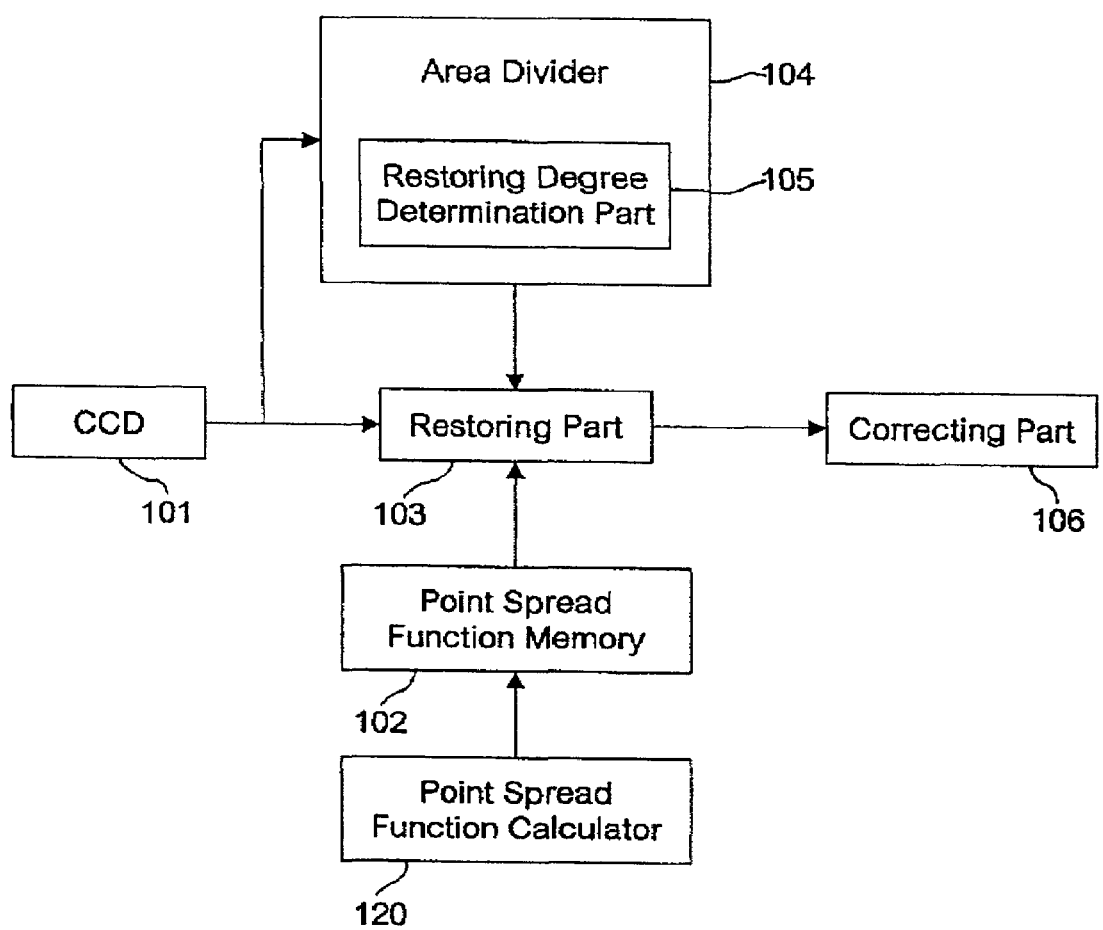
FIG. 12 is a block diagram showing the structure of a function associated with photo-taking of the digital camera.

FIG. 12 is a block diagram showing the structure of a function associated with photo-taking of the digital camera 1.

In FIG. 12, the digital camera 1 has the CCD 101, a point spread function calculator 120, a point spread function storage 102, a restorer 103, an area divider 104, a restoration degree determiner 105 and a corrector 106.

The CCD 101 as a light receiving element array converts the object image to an image signal.

The point spread function calculator 120 obtains, at the time of photo-taking, the point spread function from the degradation information such as the information on the lens arrangement and the aperture value transmitted from a lens control system and an aperture stop control system. In the point spread function storage 102, the point spread function calculated by the point spread function calculator 120 is stored.

The restoration degree determiner 105 determines the degree of image restoration based on the difference between each pixel and a neighboring pixel of the pixel in the image obtained by the CCD 101, for example, the difference in contrast.

The area divider 104 divides the image into a plurality of areas based on the determined restoration degree. The restorer 103 restores the area, other than the area not to be restored, of the image in accordance with the determined restoration degree by use of at least one point spread function representative of the degradation characteristic of the image. The corrector 106 makes a gradation correction and the like on the restored image.

Next, photo-taking by the digital camera 1 will be described with reference to the flowchart of FIG. 13. In the description that follows and the figures, steps are abbreviated to S.

Figure 13:
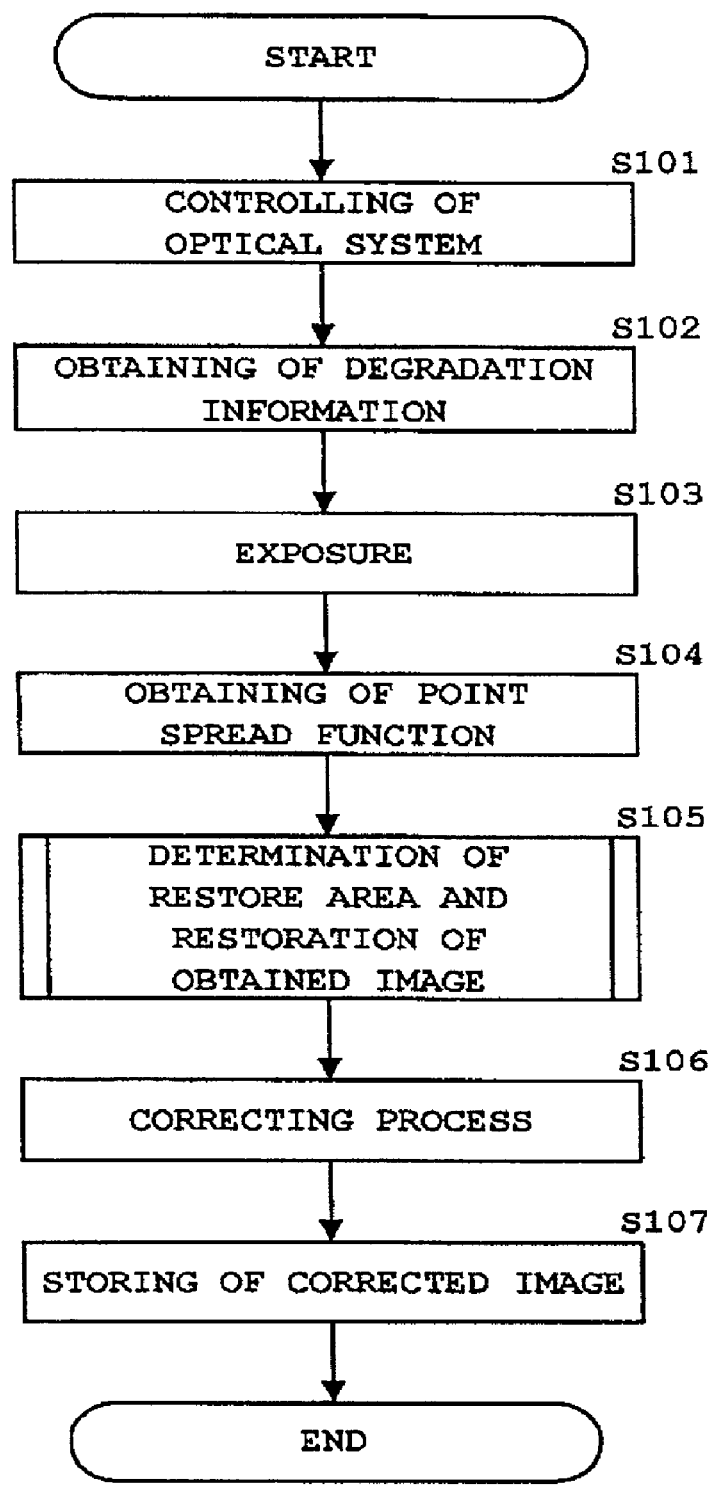
FIG. 13 is a flowchart of photo-taking by the digital camera.

In FIG. 13, when the start button 13 is depressed, at S101, the optical system is controlled in order to form an image of the object on the CCD 101. That is, a lens controller (not shown) supplies a control signal to the lens driver 211, whereby the distances between the lens elements included in the lens system 21 are controlled. Further, a control signal is applied from an aperture stop controller (not shown) to the aperture stop driver 221 to control the aperture stop 22.

At S102, the information on the lens arrangement and the aperture value are transmitted from the lens controller and the aperture stop controller to the point spread function calculator 120 as degradation information for obtaining the point spread function. Then, at S103, exposure is performed, and the image of the object obtained by the CCD 101 and the like is stored into the image memory 34 as image data. The succeeding image processing is performed on the image data stored in the image memory 34.

At S104, the point spread function calculator 120 obtains the point spread function of each pixel considering influences of the lens system 21 and the aperture stop 22 by use of the degradation information supplied from the lens controller and the aperture stop controller. The obtained point spread function is stored in the point spread function storage 102. In the point spread function storage 102, the point spread function associated with the optical low pass filter 31 is stored in advance.

At S104, it may be performed to separately obtain the point spread function for each structure and characteristic of the lens unit 2 and then, obtain the point spread function considering the entire optical system. For example, the point spread function associated with the lens system 21, the point spread function associated with the aperture stop 22 and the point spread function associated with the optical low pass filter 31 may separately be stored. Further, the point spread function associated with the lens system 21 may also separately be obtained as the point spread function associated with the focal length and the point spread function associated with the position of focus point.

Moreover, to simplify the calculation to obtain the point spread function of each pixel, it may be performed to obtain the point spread function of a representative pixel in the image and then, obtain the point spread functions of the other pixels by interpolating the point spread function of the representative pixel.

After the point spread function is obtained, at S105, the restorer 103 performs restoration on a predetermined divisional area of the obtained image (degraded image). Consequently, the degradation in the obtained image by an influence of the optical system is removed from the image. This restoration will be described later.

After the restoration, at S106, the corrector 106 performs various image processings such as white balance correction, gamma correction, noise removal, color correction and color enhancement on the restored image, and at S107, the corrected image data is stored in the image memory 34. The image data in the image memory 34 is stored into the memory card 91 through the card slot 14 as required.

Figure 14:
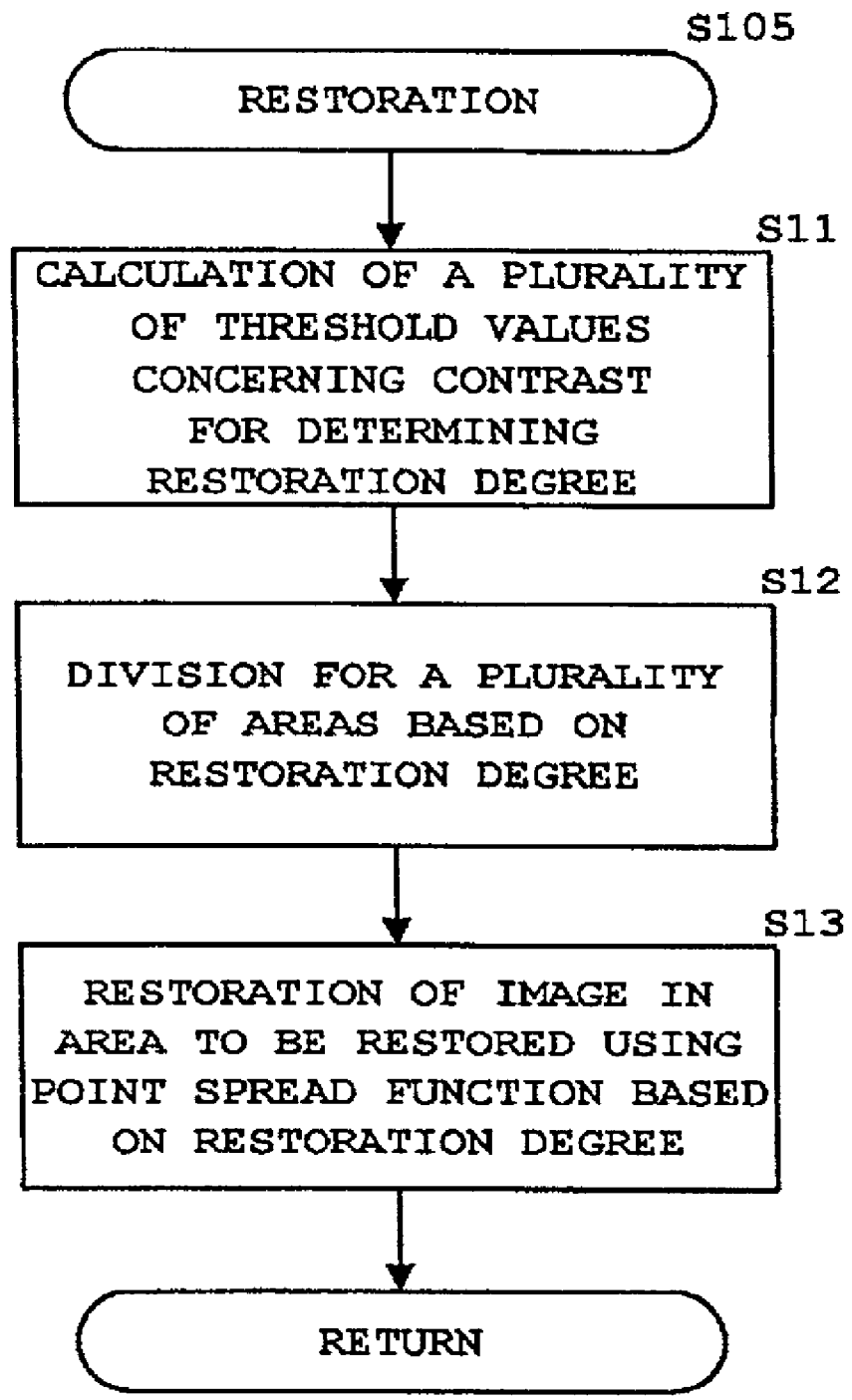
FIG. 14 is a flowchart of a restoration routine.

The subroutine of the image restoration (S105) is shown in FIG. 14.

First, at S11, a plurality of threshold values associated with the contrast of the obtained image is calculated, and the restoration level (degree) is determined.

Here, contrast is the difference between the values of the target pixel and a neighboring pixel, and can be obtained by convoluting the obtained image and an appropriate differential filter and calculating the absolute value for each pixel (hereinafter, this image will be referred to as gradient image). That is, a threshold value is set to the gradient value and the restoration degree V is determined.

Figure 15:
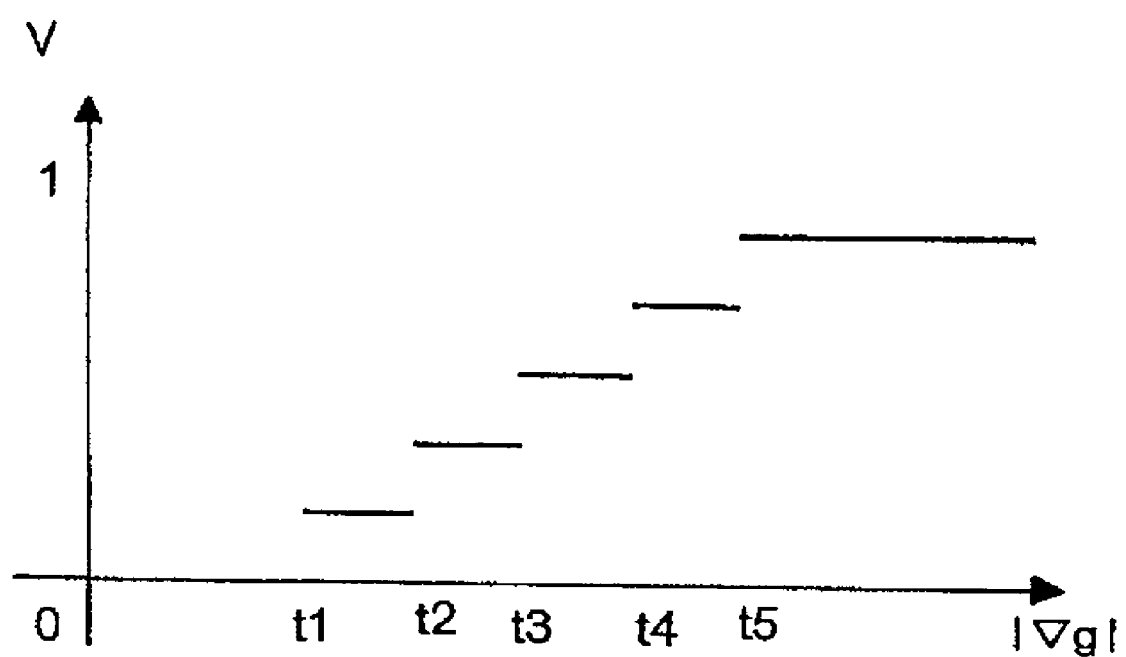
FIG. 15 is a view of assistance in explaining an example of setting of a plurality of threshold values associated with the contrast of the obtained image.

For example, five threshold values t1 to t5 are set as shown in FIG. 15, and the restoration degree V is set for each of the following six levels: 0 to t1; t1 to t2; t2 to t3; t3 to t4; t4 to t5; and higher than t5. Here, V=0 indicates that no restoration is performed, and V=1 indicates that the image is completely restored. The other four intermediate values are considered to indicate the restoration degrees corresponding to the values.

Figure 16:
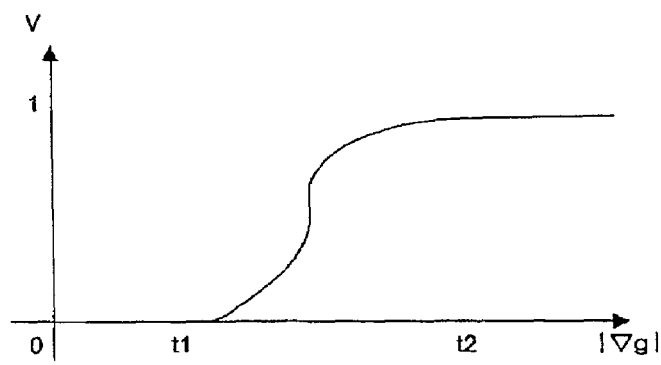
FIG. 16 is a view of assistance in explaining an example of setting of continuous threshold values associated with the contrast of the obtained image.

While the restoration degree V is set for the six gradient levels in the description given above, the restoration degree V may be set for all the gradient values as shown in FIG. 16.

Then, at S12, the obtained image is divided into a plurality of areas by use of the restoration degree V. That is, by determining which of the values of the six restoration degrees V each pixel belongs to by use of the gradient image, the entire image is divided into six classes. In the description that follows, the diagonal element represents the value of the restoration degree V, and the diagonal matrix having an element whose position in the matrix corresponds to the pixel number and having an element being the square of the number of pixels is newly represented by the restoration degree V.

After the area division, at S13, the area to be restored of the image is restored by use of the point spread function in accordance with the determined restoration degree V. This is equivalent to solving a minimization problem (P), with an equal sign constraint condition, of the following expression 3:

$$\|V^{1/2}(HX-Y)\|^2 \Rightarrow \min$$

$$\text{s.t. } X_i = X_i^0 (\text{for } i \in \{j | V_{jj} = 0\})(P) \quad (3)$$

where $V^{1/2}$ is a diagonal matrix having the square root of the diagonal element of V as the diagonal element, $X^0$ is the degraded obtained image, and $$X_i^0 \quad (4)$$

is the i component thereof.

It is considered that in the problem (P), for the pixels where the element of the weighting matrix V representative of the restoration degree is 0, the pixel values of the obtained image Y are used as they are, and for the other pixels, weight is assigned to the residual between the pixels in accordance with the value of V.

Expanding the norm, the problem (P) is equivalent to a quadratic programming problem (P') of the following expression 5:

$$X^T H^T V H X - 2 X^T H^T V \Rightarrow \min$$

$$\text{s.t. } X^i = X^0_i (\text{for } i \in \{j | V_{jj} = 0\})(P') \quad (5)$$

The quadratic programming problem (P') can be solved, for example, by use of an iteration method such as the steepest-descent method (Richardson method) with a fixed step size like the following expression 6:

$$X_i^{n+1} = X_i^n - k(H^T V(HX^n - Y))_i \text{ for } i \in \{j | V_{jj} \neq 0\}$$

$$X_i^{n+1} = X_i^0 \text{ for } i \in \{j | V_{jj} = 0\} \quad (6)$$

where $$X_i^n \quad (7)$$

is the i-th component of the updated image X after the n-th iteration, and k is an appropriately selected constant.

Convergence is determined based on whether a residual norm $\|HX-Y\|$ or a weighted residual norm $\|V^{1/2}(HX-Y)\|$ is smaller than a predetermined value or not.

As described above, in the digital camera 1, since the image degradation by an influence of the optical system is removed by use of the point spread function representative of the characteristic of the degradation by the optical system, an influence such as occurrence of ringing and increase in noise on areas not affected by degradation can be suppressed, and the image is divided into a plurality of areas based on the restoration degree V and each of the areas of the image is restored in accordance with the determined restoration degree V, discontinuity on the border between a plurality of divisional areas is reduced unlike when the image is merely divided into two areas, so that a natural restored image can be obtained.

Next, a second embodiment of the present invention will be described.

When an area to be restored is determined by use of the contrast of the obtained image Y, the contrast is low in a completely blackened area, and this area is not included in the area to be restored. That is, the point spread function has a characteristic that eliminates or reduces a specific frequency component, and for example, there are cases where the contrast of a striped area in the original (ideal image) becomes substantially zero in the obtained image Y.

An apparatus and a method modifying, to solve this problem, image division based on the contrast of the obtained image (degraded image) and the contrast of the restored image will be described with reference to FIGS. 17 and 18.

Figure 17:
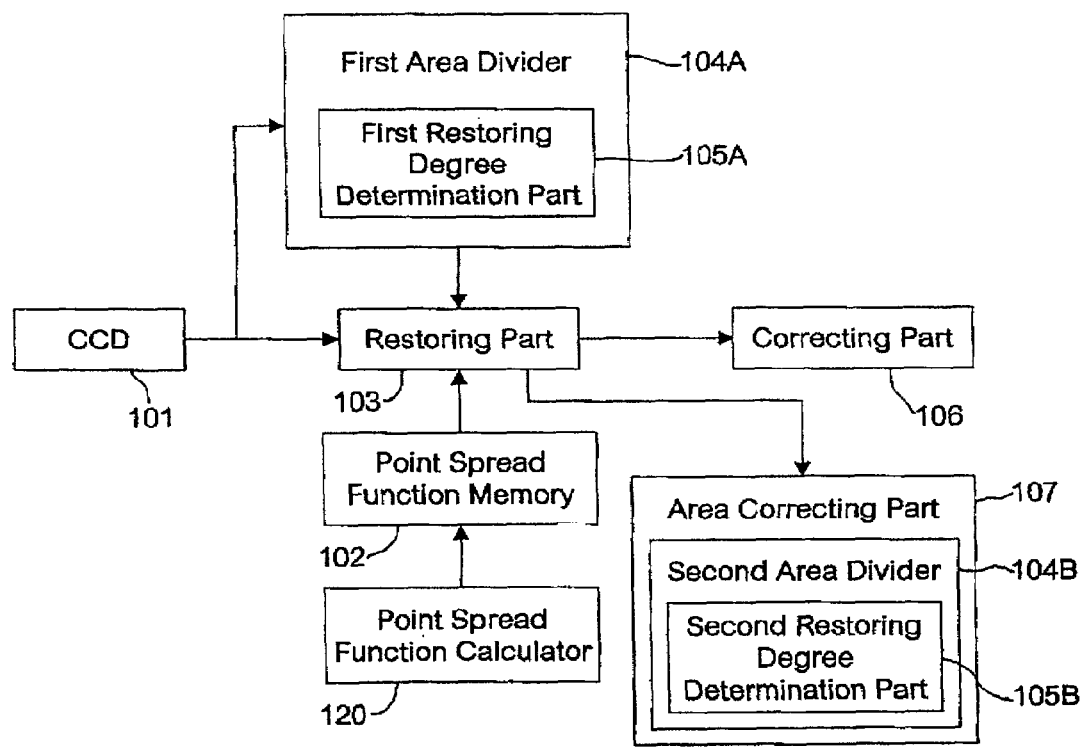
FIG. 17 showing a second embodiment of the present invention is a block diagram showing the structure of a function associated with photo-taking of a digital camera.

FIG. 17 is a block diagram showing the structure of a function associated with photo-taking of the digital camera 1. The same parts as those of FIG. 12 are designated by the same reference numbers and description thereof is omitted.

In FIG. 17, the digital camera 1 has first and second restoration degree determiners 105A and 105B, first and second area dividers 104A and 104B and an area modifier 107.

The first restoration degree determiner 105A determines the image restoration degree based on the difference in contrast between each pixel and a neighboring pixel of the pixel in the image obtained by the CCD 101. The first area divider 104A divides the image into a plurality of areas based on the determined restoration degree. The restorer 103 restores the area, other than the area not to be restored, of the image in accordance with the determined restoration degree like in the first embodiment.

The second restoration degree determiner 105B re-determines the restoration degree based on the restored image (the contrast of the restored image) and the obtained image (the contrast of the obtained image). The second area divider 104B re-divides the image into a plurality of areas based on the restoration degree determined by the second restoration degree determiner 105B. The area modifier 107 modifies the area to be restored to re-perform the image restoration by the restorer 103.

Figure 18:
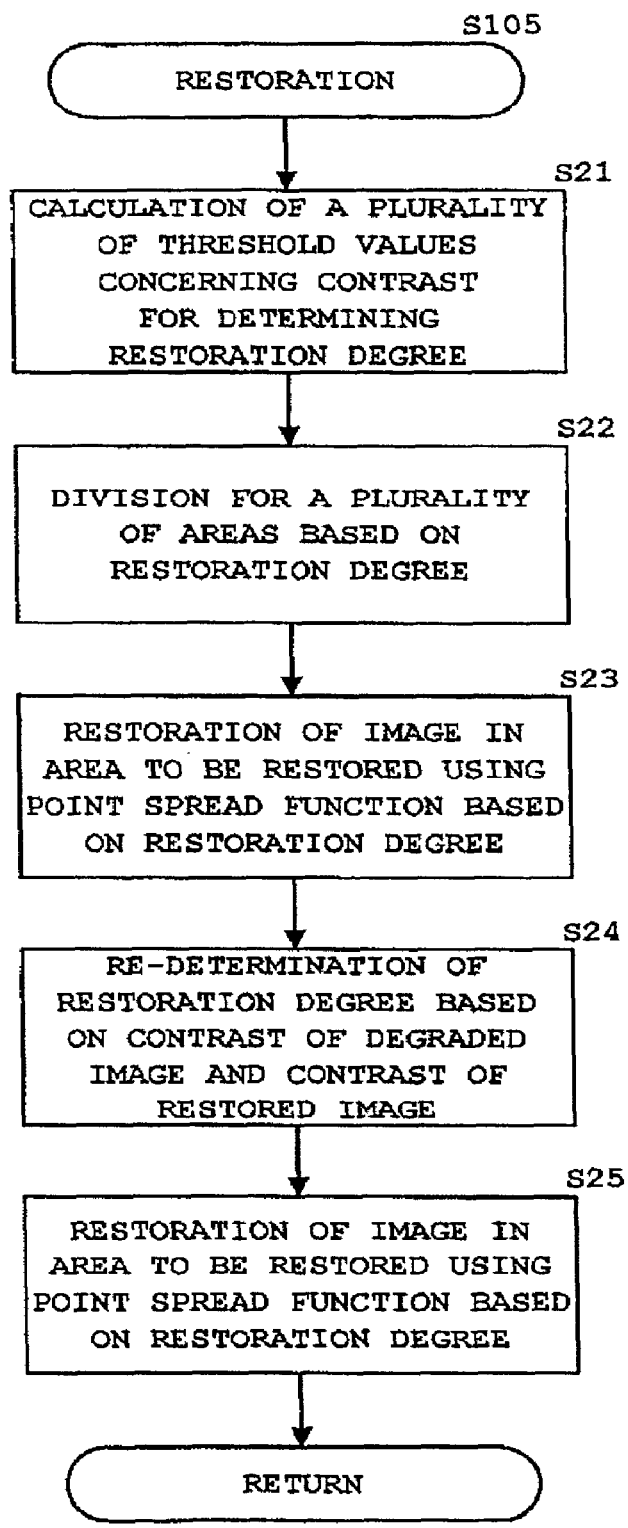
FIG. 18 is a flowchart of a restoration routine.

The subroutine of the image restoration (S105) in the second embodiment is shown in FIG. 18.

First, at S21, the first restoration degree determiner 105A calculates a plurality of threshold values associated with the contrast of the obtained image, and determines the restoration degree. The method of the determination is the same as that of the first embodiment; a threshold value is set to the gradient value and the restoration degree is determined.

Then, at S22, the first area divider 104A divides the obtained image into a plurality of areas by use of the determined restoration degree V. The method of the division is also the same as that of the first embodiment; by determining which of the values of the six restoration degrees V each pixel belongs to by use of the gradient image, the entire image is divided into six classes. After the area division, at S23, the area to be restored of the image is restored by use of the point spread function in accordance with the determined restoration degree V.

At S24, after the restored image is obtained, the second restoration degree determiner 105B re-determines the restoration degree based on the contrast of the obtained image and the contrast of the restored image, the second area divider 104B re-divides the restored image based on the re-determined restoration degree, and the area modifier 107 modifies the area to be restored.

Assume now that the restoration degree weighting matrix based on the contrast of the obtained image Y is Vo and the restoration degree weighting matrix based on the contrast of the restored image is Vr. For example, when the entire image is the area to be restored, Vo is an identity matrix.

When a matrix in which the elements of the restoration degree weighting matrix Vr that are lower than a given threshold value are zero is Vr' and a matrix in which the elements of the restoration degree weighting matrix Vo that correspond to the remaining elements of the restoration degree weighting matrix Vr are zero is Vo', a new restoration degree weighting matrix Vn can be calculated by the following expression 8:

$$V_n = V_o' + V_r' \qquad (8)$$

Then, at S25, restoration is performed by use of the new restoration degree weighting matrix Vn.

Since area modification is performed by use of the restored image as described above, restoration accuracy is further improved.

Next, a third embodiment of the present invention will be described.

Normally, random noise is superimposed on the obtained image and the point spread function, and there are cases where the noise is enhanced in the restored image. An apparatus and a method composing a plurality of restored images restored by use of different restoration degree weighting matrices to solve this problem will be described with reference to FIGS. 19 and 20.

Figure 19:
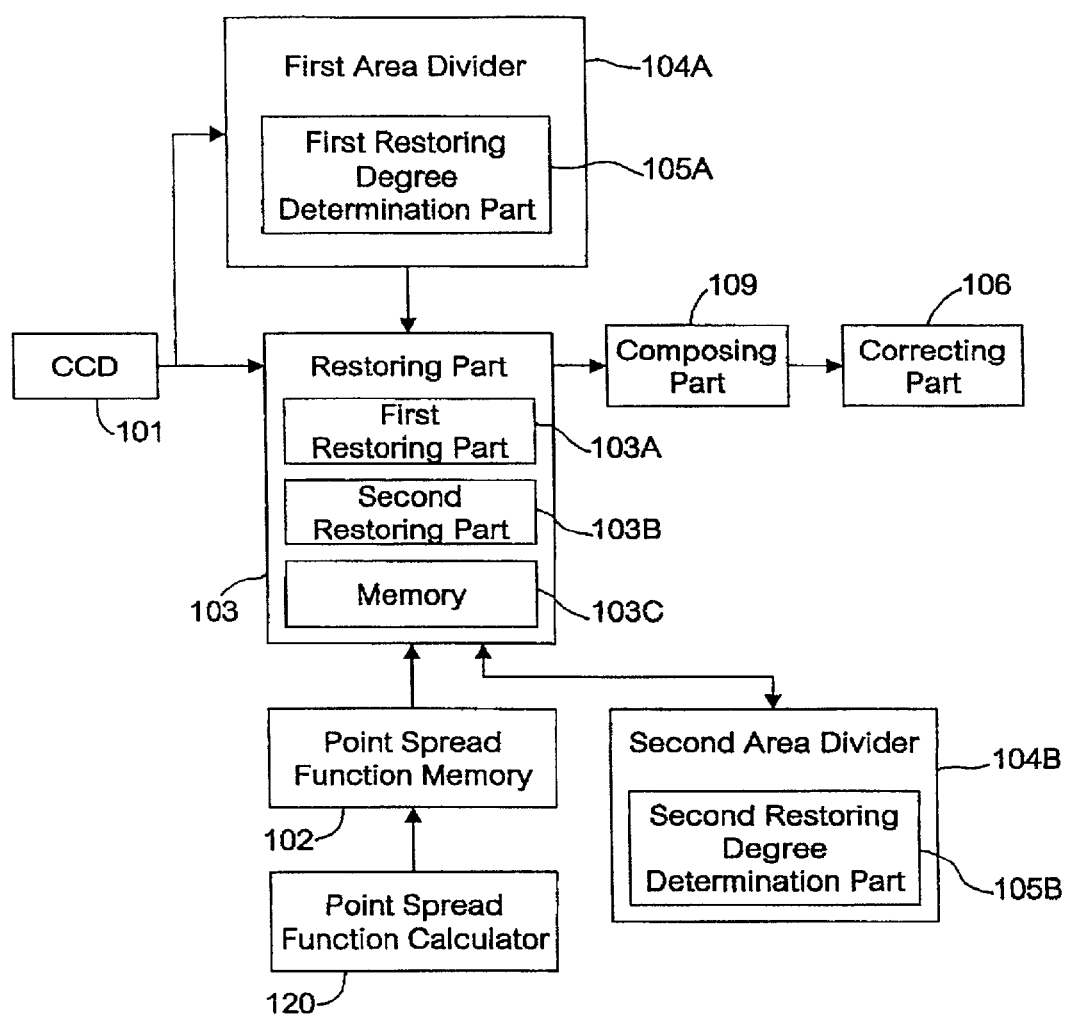
FIG. 19 showing a third embodiment of the present invention is a block diagram showing the structure of a function associated with photo-taking of a digital camera.

FIG. 19 is a block diagram showing the structure of a function associated with photo-taking of the digital camera 1. The same parts as those of FIG. 17 are designated by the same reference numbers and description thereof is omitted.

In FIG. 19, the digital camera 1 has a composer 109 as well as the first and the second area dividers 104A and 104B and the first and the second restoration degree determiners 105A and 105B, and the restorer 103 has a first restorer 103A, a second restorer 103B and a storage 103C.

The first restorer 103A restores the area, other than the area not to be restored, of the image in accordance with the restoration degree determined by the first restoration degree determiner 105A. The second restorer 103B restores the area, other than the area not to be restored, of the image in accordance with the restoration degree determined by the second restoration degree determiner 105B. In the storage 103C, the image restored by the first restorer 103A is temporarily stored. The composer 109 composes the first restored image stored in the storage 103C and the second restored image restored by the second restorer 103B.

Figure 20:
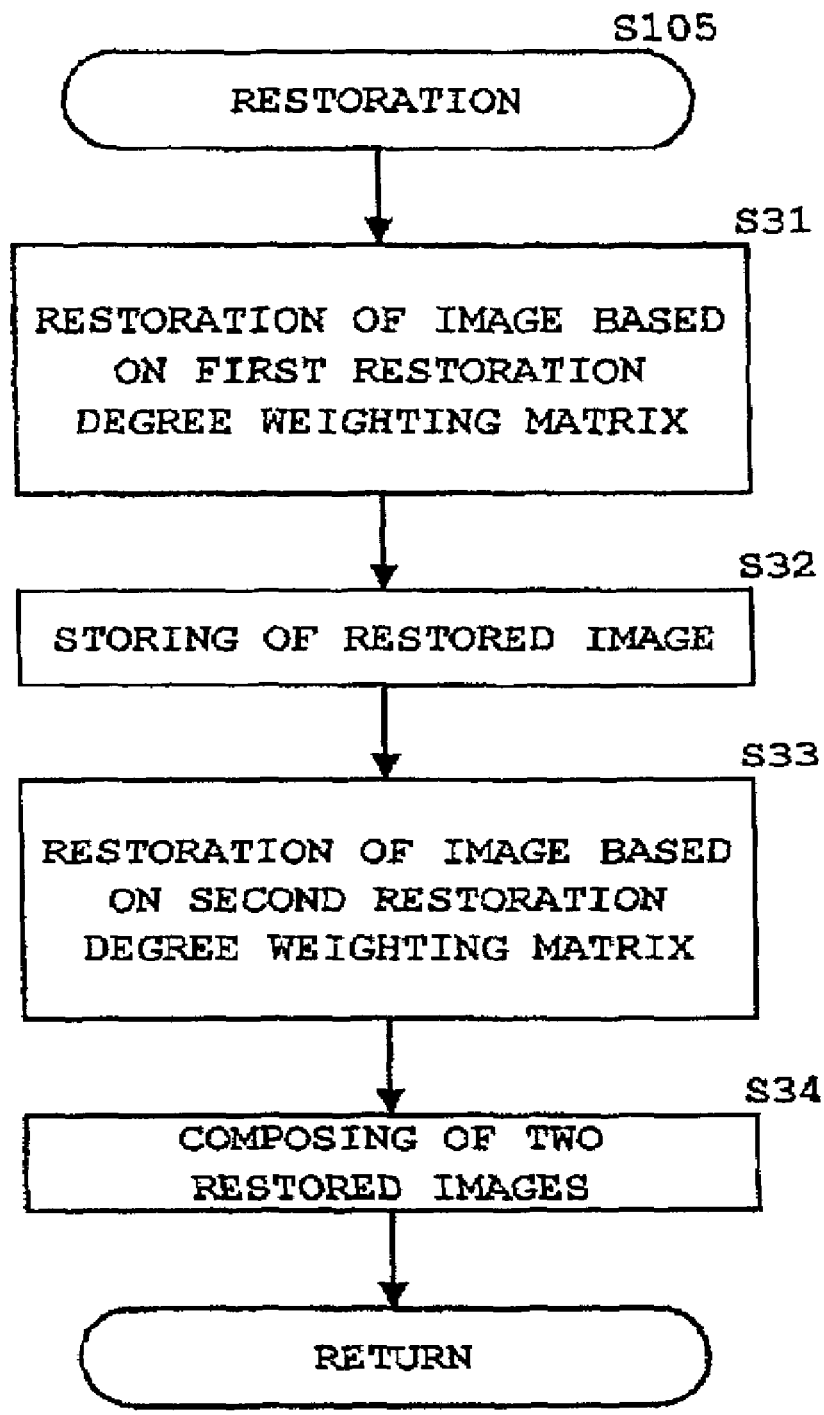
FIG. 20 is a flowchart of a restoration routine.

The subroutine of the image restoration (S105) in the third embodiment is shown in FIG. 20.

Here, a case where two restored images are used will be described as an example.

At S31, the image is restored based on a restoration degree weighting matrix $V_1$, and the image is designated by $I_1$. At S32, the restored image $I_1$ is temporarily stored in the storage 103C.

Then, at S33, the image is restored based on another restoration degree weighting matrix $V_2$, and the image is designated by $I_2$. At S34, the composer 109 composes the restored image $I_1$ and the restored image $I_2$ by use of an appropriate weight V ($0 \leq V_i \leq 1$) by the following expression 9:

$$I = V \cdot I_1 + (1-V) I_2 \qquad (9)$$

By composing a plurality of images as described above, noise is reduced in the composite image I.

While the image restoration is performed by the digital camera 1 in the description given above, an image taken by a digital camera or the like may be restored by an external apparatus such as a computer. In this case, the restoration routine described in each embodiment is a program. The program is read into a computer through a network or a recording medium, and is executed on the computer.

As described above, by determining the restoration degree for each portion of the image and restoring each portion of the image according to the determined restoration degree, ringing and noise enhancement are suppressed to the utmost, and discontinuity on the border between the divisional areas is reduced unlike when the image is divided into two kinds of areas, so that a natural restored image can be obtained.

Moreover, by the restoration degree determination part determining the restoration degree of each portion based on the difference between each pixel and a neighboring pixel of the pixel, the restoration degree can accurately be determined.

Further, by providing the second restoration degree determination part for re-determining the restoration degree of each portion based on the image restored by the restoring part and the second restoring part for re-restoring the image in accordance with the re-determined restoration degree, for example, even when the contrast is so low that the area is not determined to be an area to be restored, since the area is modified in the restored image and restoration is performed, restoration can highly accurately be performed.

Further, by providing the composing part for composing the image restored by the restoring part and the image restored by the second restoring part and composing the images of different restoration degrees, for example, noise can effectively be prevented from being enhanced in the restored image.

The above-described restoration may be performed by a computer.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image restoration apparatus comprising:
   a storage part containing predetermined data indicative of at least one point spread function representative of a degradation characteristic of an image;

a restoration degree determination part determining a restoration degree for portions of the image based on the pixels of the image;

a dividing part dividing the image into a plurality of areas based on the restoration degree determined by the restoration degree determination part; and a restoring part restoring each of the divided areas of the image in accordance with the determined restoration degree and the predetermined data indicative of at least one point spread function representative of a degradation characteristic of the image, wherein the restoration degree determination part determines the restoration degree of each portion based on a difference between each pixel and a neighboring pixel of the pixel.

2. An image restoration apparatus according to claim 1, further comprising:

a second restoration degree determination part re-determining the restoration degree of each portion based on an image restored by the restoring part; and a second restoring part re-restoring the image based on the re-determined restoration degree.

3. An image restoration apparatus according to claim 2, further comprising a composer composing the image restored by the restoring part and an image restored by the second restoring part.

4. An image restoration method comprising:

determining a restoration degree for portions of an image based on the pixels of the image;

dividing the image into a plurality of areas based on the restoration degree determined by the restoration degree determination part; and restoring each of the divided areas of the image in accordance with the determined restoration degree and predetermined data indicative of at least one point spread function representative of a degradation characteristic of the image, wherein in the determination of the restoration degree, the restoration degree of each portion is determined based on a difference between each pixel and a neighboring pixel of the pixel.

5. An image restoration method according to claim 4, further comprising:

re-determining the restoration degree of each portion based on an image restored by the restoring part; and re-restoring the image in accordance with the re-determined restoration degree.

6. An image restoration method according to claim 5, further comprising composing the restored image and a re-restored image.

7. A computer-readable program based on which a computer performs the following operations:

determining a restoration degree for portions of an image based on the pixels of the image;

dividing the image into a plurality of areas based on the restoration degree determined by the restoration degree determination part; and restoring each of the divided areas of the image in accordance with the determined restoration degree and predetermined data of at least one point spread function representative of a degradation characteristic of the image, wherein in the determination of the restoration degree, the restoration degree of each portion is determined based on a difference between each pixel and a neighboring pixel of the pixel.

8. A computer-readable program according to claim 7, further comprising:

re-determining the restoration degree of each portion based on an image restored by the restoring part; and re-restoring the image in accordance with the re-determined restoration degree.

9. A computer-readable program according to claim 8, further comprising composing the restored image and a re-restored image.

10. A recording medium in which a program based on which a computer performs the following operations is stored:

determining a restoration degree for portions of an image based on the pixels of the image;

dividing the image into a plurality of areas based on the restoration degree determined by the restoration degree determination part; and restoring each of the divided areas of the image in accordance with the determined restoration degree and predetermined data of at least one point spread function representative of a degradation characteristic of the image, wherein in the determination of the restoration degree, based on the program, the computer determines the restoration degree of each portion based on a difference between each pixel and a neighboring pixel of the pixel.

11. A recording medium according to claim 10, wherein based on the program, the computer further re-determines the restoration degree of each portion based on an image restored by the restoring part, and re-restores the image in accordance with the re-determined restoration degree.

12. A recording medium according to claim 11, wherein based on the program, the computer further composes the restored image and a re-restored image.

* * * * *